United States Patent [19]

Altermatt et al.

[11] 4,439,207
[45] Mar. 27, 1984

[54] STABLE DISPERSE DYE COMPOSITIONS COMPRISING AT LEAST TWO MONOAZO DYES

[75] Inventors: Ruedi Altermatt, Buckten; Hans Jakob, Oberwil, both of Switzerland

[73] Assignee: Sandoz Ltd., Basel, Switzerland

[21] Appl. No.: 405,500

[22] Filed: Aug. 5, 1982

[30] Foreign Application Priority Data

Aug. 7, 1981 [DE] Fed. Rep. of Germany ....... 3131270

[51] Int. Cl.$^3$ .................. C09B 67/38; D06P 1/18
[52] U.S. Cl. ............................. 8/639; 8/921; 8/922; 8/924; 8/512; 8/516; 8/519
[58] Field of Search ............................................. 8/639

[56] References Cited

U.S. PATENT DOCUMENTS

| | | | |
|---|---|---|---|
| 2,891,942 | 6/1959 | Merian | 260/207.1 |
| 3,535,306 | 10/1970 | Altermatt et al. | 260/207.1 |

FOREIGN PATENT DOCUMENTS 2601208 11/1976 Fed. Rep. of Germany.

*Primary Examiner*—A. Lionel Clingman
*Attorney, Agent, or Firm*—Gerald D. Sharkin; Richard E. Vila; Melvyn M. Kassenoff

[57] ABSTRACT

Disperse dye compositions comprising
(a) 20 to 55% by weight of a dye of the formula

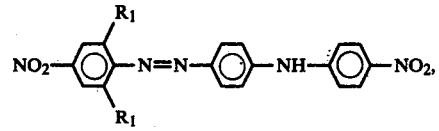

wherein each $R_1$ is independently halogen,
(b) 5 to 40% by weight of at least one dye of the formula

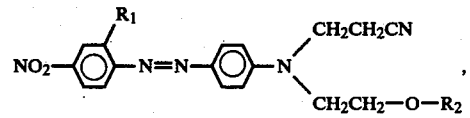

wherein $R_1$ is halo, and $R_2$ is hydrogen, ($C_{1-4}$alkyl)-carbonyl or benzoyl; and
(c) 30 to 60% by weight of one or more dispersing agents and any other additives that may be present.

Components (a), (b) and (c) forming 100% dry weight of the composition.

20 Claims, No Drawings

STABLE DISPERSE DYE COMPOSITIONS COMPRISING AT LEAST TWO MONOAZO DYES

The invention relates to disperse dye compositions which remain stable during dyeing. It has, up until now, been difficult to prepare compositions of disperse dyes giving a yellow to yellow-brown nuance at high dye concentrations and at the same time producing a stable dispersion in the dyebath. Such dispersions should remain stable under dyeing conditions so that dyestuff is not separated by filtration effects during dyeing, for example in cross wound spool dyeing. For the preparation of such highly concentrated dispersions the choice of the dyestuffs in the mixture becomes important.

The invention provides a disperse dye composition comprising (a) 20–55% by weight of a dyestuff of formula I

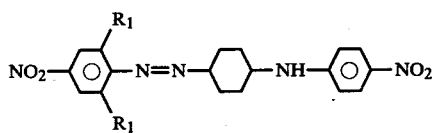

in which $R_1$ is halogen;

(b) 5 to 40% by weight of at least one dyestuff of formula II

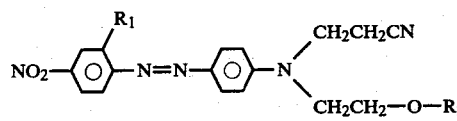

in which $R_1$ is as above defined and $R_2$ is hydrogen, —CO—$C_{1-4}$alkyl or —CO—$C_6H_5$; and (c) 30 to 60% by weight of one or more dispersing agents and any other additives that may be present;

components (a), (b) and (c) forming 100% dry weight of the composition (when the dyestuffs I and II are in pure form).

Where any symbol appears more than once in a formula, the significances are independent of one another. By the term halogen is meant chlorine, bromine and iodine.

The composition may be prepared as a solid form or as a liquid concentrate, 40 to 60% by weight of concentrate being water in aqueous dispersion form.

Preferably $R_1$ is chlorine or bromine, more preferably chlorine.

Preferably $R_2$ is hydrogen, —CO—$CH_3$, —$COC_2H_5$, —$COCH_2CH(CH_3)_2$ or —CO—$C_6H_5$, more preferably hydrogen, —$COCH_3$ or $COC_2H_5$, most preferably, hydrogen or —$COCH_3$.

Preferably in a disperse dye compositions according to the invention one or two compounds of formula II are present.

Preferably the disperse dye composition according to the invention comprises 30 to 55% by weight of component (a), 5 to 30% by weight of component (b) and 35 to 50% by weight of component (c), with the proviso that the sum of components (a) and (b) is 50 to 65% by weight.

More preferably the disperse dye composition according to the invention comprises 35 to 55% by weight of component (a), 5 to 25% by weight of component (b) and 35 to 50% by weight of component (c).

The compounds of formulae I and II per se are known and may be prepared according to known methods.

Dispersing agents of component (c) are those generally known for use in disperse dye compositions, for example ligninsulphonate or synthetic products.

Examples of dispersing agents used can be found in British Pat. No. 1,114,433. Amongst these are anionic or non-ionic dispersants, often in the form of mixtures of two or more. Known anionic dispersants suitable for use in the compositions of the invention are, for example, condensates from naphthalenesulphonic acids and formaldehyde (especially dinaphthylmethanedisulphonates), esters of sulphonated succinic acid, Turkey red oil and alkali metal salts of sulphuric acid esters of fatty alcohols, for example sodium lauryl sulphate, sodium cetyl sulphate, sulphite cellulose waste liquor or alkali metal salts thereof, soaps or alkali metal sulphates of monoglycerides of fatty acids. Examples of known and particularly suitable non-ionic dispersants are the adducts of 3 to 40 mols of ethylene oxide with alkyl phenols, fatty alcohols or fatty amines and neutral sulphuric esters thereof.

Examples of the compounds that may make up component (c) in addition to the dispersing agents are water-soluble salts (which also have a buffering effect); one or more further dyestuffs to control the nuance (these dyes will make up 0.5 to 2% by weight of the total composition if present); agents to dissolve hard water deposits; and agents to prevent the composition from foaming (if the composition is in liquid form) or from forming dust (if the composition is in solid form).

Examples of dyestuffs of component (c) are as follows:

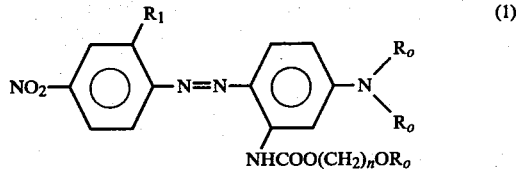

where $R_o$ is $C_{1-4}$alkyl, n is a number from 1 to 4 and $R_1$ is defined above;

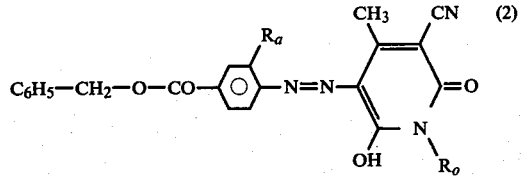

where $R_a$ is hydrogen or halogen, and $R_o$ and $R_1$ are as defined above.

The dyes of the disperse dye compositions according to the invention exhaust extremely well from aqueous dispersion on textile material of fully synthetic or semi-synthetic hydrophobic high molecular weight fibres. Particularly preferred fibres for dyeing, printing or padding with the dyes of a disperse dye composition according to the invention are linear aromatic polyesters, cellulose triacetate, cellulose 2½ acetate and synthetic polyamides.

Dyeing, padding or printing can be carried out according to British Pat. No. 1,114,433.

In the following Examples all parts and percentages are by weight and all temperatures are in °C. unless indicated to the contrary.

EXAMPLE 1

80 Parts of the dyestuff of the formula (i)

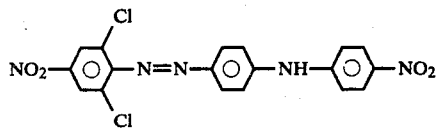
(i)

as component (a)

40 parts of the dyestuff of the formula (ii)

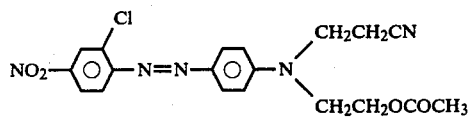
(ii)

as component (b)

and 80 parts of a mixture of commercial ligninsulphonate as component (c) in 100 to 200 parts water with 600 parts by volume of siliquarzite beads are placed in a 1500 cc beaker and are stirred for about 6 hours at 2000–2500 turns per minute with a two plate stirrer. The mixture is then thinned with about 200 parts water and filtered through a glass filtering flask under vacuum. The resulting disperse dye composition remaining on the siliquarzite beads is washed into the flask with a little water. The so-formed dispersion is then brought to pH 8 with the addition of phosphoric acid and then atomised (with a laboratory spray drier—air temperature 130° and inner temperature 55°–60°). The disperse dye composition has a good dispersion stability in water.

EXAMPLES 2 to 14

According to the method of Example 1 further disperse dye compositions according to the invention may be formed as set out in the Table below. In the Table Compounds of formula Ia are of the formula

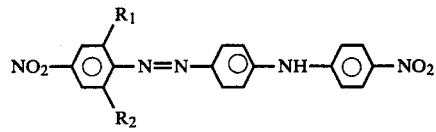

and compounds of formula II are of the formula

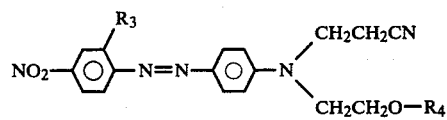

TABLE

| Ex. No. | Formula Ia Parts | $R_1$ | $R_2$ | Parts | Formula II $R_3$ | $R_4$ | Dispersing Agent Parts |
|---|---|---|---|---|---|---|---|
| 2 | 50 | Cl | Cl | 10 | Br | H | 40 |
| 3 | 50 | Cl | Cl | 10 | Cl | H | 40 |
| 4 | 40 | Cl | Cl | 10 | Cl | H | 40 |
|   |    |    |    | 10 | Cl | —COCH$_3$ |    |
| 5 | 40 | Cl | Br | 20 | Cl | —COCH$_3$ | 40 |
| 6 | 35 | Br | Br | 10 | Br | —COCH$_3$ | 40 |
|   |    |    |    | 10 | Cl | —COCH$_2$CH$_3$ | 40 |
|   |    |    |    | 5  | Br | H |    |
| 7 | 45 | Cl | Cl | 10 | Cl | H | 45 |
| 8 | 40 | Cl | Cl | 22 | Cl | —CO—C$_6$H$_5$ | 38 |
| 9 | 40 | Cl | Cl | 22 | Cl | —COCH$_2$CH(CH$_3$)$_2$ | 38 |
| 10 | 45 | Cl | Cl | 9 | Cl | H | 45 |
|    |    |    |    | 1 | 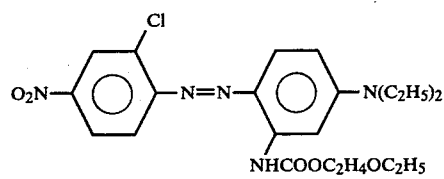 | | |
| 11 | 49 | Cl | Cl | 9 | Cl | —COCH$_3$ | 41 |
|    |    |    |    | 1 | 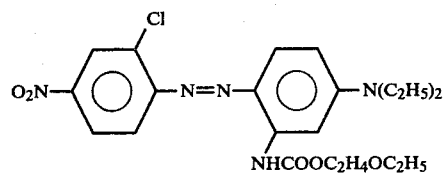 | | |
| 12 | 45.2 | Cl | Cl | 9.8 | Cl | —COCH$_3$ | 45 |
| 13 | 35.9 | Cl | Cl | 19 | Cl | —COCH$_3$ | 45.1 |
| 14 | 35 | Cl | Cl | 19 | Cl | —COCH$_3$ | 45 |

| Ex. No. | Formula Ia Parts | $R_1$ | $R_2$ | Parts | Formula II $R_3$ | $R_4$ | Dispersing Agent Parts |
|---|---|---|---|---|---|---|---|
| | | | | 1 | | 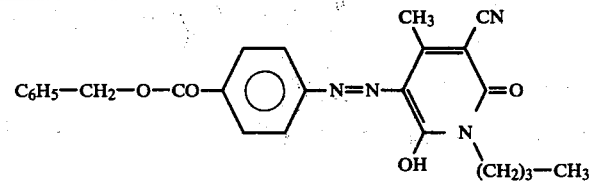 | |

DYEING PROCEDURE

10 Parts of the disperse dye composition of Example 1 are dispersed in 1000 parts of water and this is then introduced into 13,000 parts of a circulating liquor at 60° in a dyeing autoclave. The liquor comprises 30 parts of ammonium sulphate and 0.3 parts of formic acid to buffer the solution.

A cross wound spool that has been recleaned and pressed (the spool having 1000 parts of polyester yarn on a plastic frame) is then immersed in the liquor, then the dyeing autoclave is closed and the liquor is then heated from 60° to 130° C. over 35 minutes. After 15 minutes at 130° the autoclave is cooled to 80° and then the liquor is drained. The dyed spool is washed thoroughly with cold water, rinsed and dried.

An approximately 2/1 standard depth of dyeing, level and pure is obtained having a yellow nuance and free of side products. The dyeing so produced has very good wet fastness and rubbing properties. The backwater is practically clourless and as the dyeing apparatus shows no retention of dye, it is immediately free for further use.

What is claimed is:

1. A disperse dye composition comprising
(a) 20–55% by weight of a dye of the formula

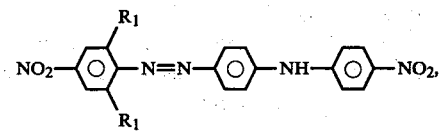

wherein each $R_1$ is independently halo,
(b) 5–40% by weight of at least one dye of the formula

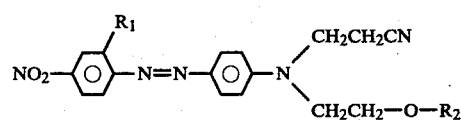

wherein $R_1$ is halo, and $R_2$ is hydrogen, ($C_{1-4}$alkyl)-carbonyl or benzoyl, and
(c) 30–60% by weight of (i) a dispersing agent, (ii) a mixture of dispersing agents, (iii) a mixture of at least one dispersing agent and at least one other additive or dye or (iv) a mixture of at least one dispersing agent, at least one other additive and at least one other dye, with the proviso that Components (a), (b) and (c) together constitute 100% of the dry weight of the composition.

2. A disperse dye composition according to claim 1 comprising
(a) 20–55% by weight of a dye of the formula

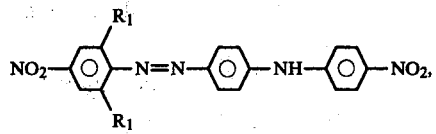

wherein each $R_1$ is independently chloro, bromo or iodo,
(b) 5–40% by weight of at least one dye of the formula

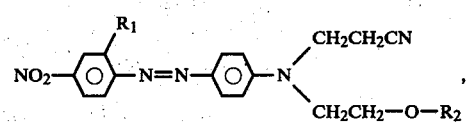

wherein $R_1$ is chloro, bromo or iodo, and $R_2$ is hydrogen, ($C_{1-4}$alkyl)carbonyl or benzoyl, and
(c) 30–60% by weight of (i) a dispersing agent, (ii) a mixture of dispersing agents or (iii) a mixture of at least one dispersing agent and at least one other dye, with the proviso that Components (a), (b) and (c) together constitute 100% of the dry weight of the composition and that when Component (c) comprises one or more other dyes, said other dye constitutes, or said other dyes constitute, 0.5–2.0% of the dry weight of the composition.

3. A disperse dye composition according to claim 2 wherein Component (b) is 5–40% by weight of (i) one dye of the formula

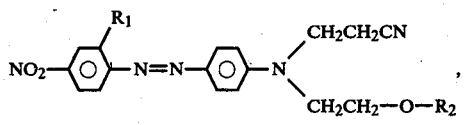

or (ii) a mixture of two dyes of the formula

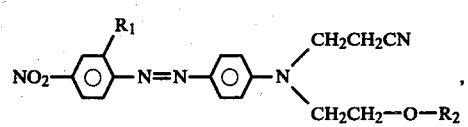

wherein $R_1$ is chloro, bromo or iodo, and $R_2$ is hydrogen, ($C_{1-4}$alkyl)carbonyl or benzoyl.

4. A composition according to claim 3 comprising
(a) 20–55% by weight of one dye of the formula

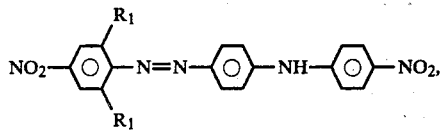

wherein each $R_1$ is independently chloro, bromo or iodo, (b) 5-40% by weight of (i) one dye of the formula

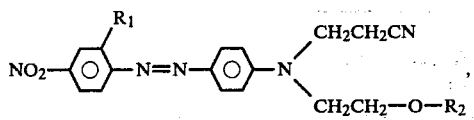

or (ii) a mixture of two dyes of the formula

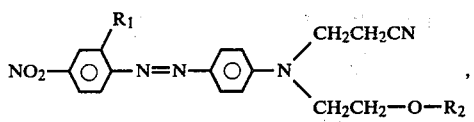

wherein $R_1$ is chloro, bromo or iodo, and $R_2$ is hydrogen, ($C_{1-4}$alkyl)carbonyl or benzoyl, and (c) 30-60% by weight of (i) a dispersing agent or (ii) a mixture of dispersing agents, with the proviso that Components (a), (b) and (c) together constitute 100% of the dry weight of the composition.

5. A disperse dye composition according to claim 4 comprising 30-55% by weight of Component (a), 5-30% by weight of Component (b) and 35-50% by weight of Component (c), with the proviso that Components (a) and (b) together constitute 50-65% of the dry weight of the composition and Components (a), (b) and (c) together constitute 100% of the dry weight of the composition.

6. A disperse dye composition according to claim 5 wherein each $R_1$ is independently chloro or bromo, and $R_2$ is hydrogen or acetyl.

7. A disperse dye composition according to claim 3 wherein Component (c) comprises at least one dye selected from those of the formulae

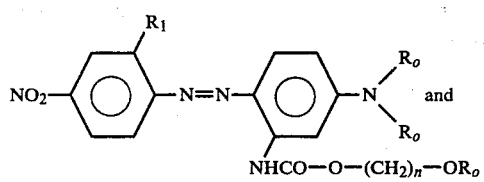

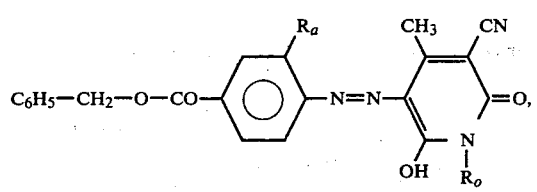

wherein $R_a$ is hydrogen, chloro, bromo or iodo, each $R_o$ is independently $C_{1-4}$alkyl, $R_1$ is chloro, bromo or iodo, and n is 1-4.

8. A disperse dye composition according to claim 1 comprising (a) 20-55% by weight of one dye of the formula

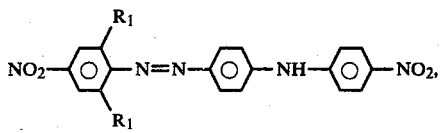

wherein each $R_1$ is independently chloro, bromo or iodo, (b) 5-40% by weight of one dye of the formula

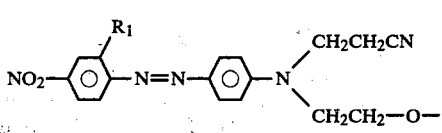

wherein $R_1$ is chloro, bromo or iodo, and $R_2$ is hydrogen, ($C_{1-4}$alkyl)carbonyl or benzoyl, and (c) 30-60% by weight of (i) a dispersing agent, (ii) a mixture of dispersing agents, (iii) a mixture of at least one dispersing agent and at least one other additive or dye or (iv) a mixture of at least one dispersing agent, at least one other additive and at least one other dye.

9. A disperse dye composition according to claim 8 comprising 30-55% by weight of Component (a), 5-30% by weight of Component (b) and 35-50% by weight of Component (c), with the proviso that Components (a) and (b) together constitute 50-65% of the dry weight of the composition and Components (a), (b) and (c) together constitute 100% of the dry weight of the composition.

10. A disperse dye composition according to claim 8 wherein each $R_1$ is independently chloro or bromo, and $R_2$ is hydrogen or acetyl.

11. A disperse dye composition according to claim 8 wherein Component (c) comprises at least one dye selected from those of the formula

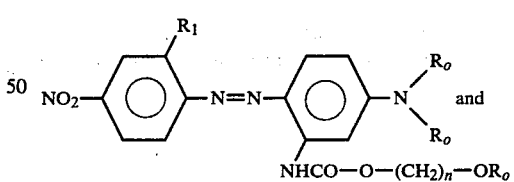

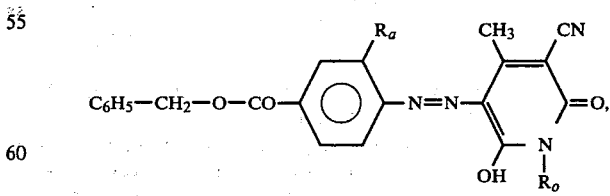

wherein $R_a$ is hydrogen, chloro, bromo or iodo, each $R_o$ is independently $C_{1-4}$alkyl, $R_1$ is chloro, bromo or iodo, and n is 1-4.

12. A composition according to claim 4 comprising (a) 20-55% by weight of one dye of the formula

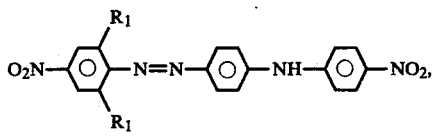

wherein each $R_1$ is independently chloro, bromo or iodo,
(b) 5–40% by weight of one dye of the formula

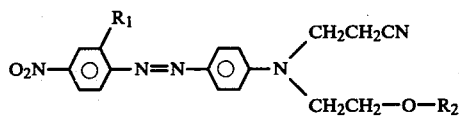

wherein $R_1$ is chloro, bromo or iodo, and $R_2$ is hydrogen, $(C_{1-4}alkyl)$carbonyl or benzoyl, and
(c) 30–60% by weight of (i) a dispersing agent or (ii) a mixture of dispersing agents,
with the proviso that Components (a), (b) and (c) together constitute 100% of the dry weight of the composition.

13. A disperse dye composition according to claim 12 comprising 30–55% by weight of Component (a), 5–30% by weight of Component (b) and 35–50% by weight of Component (c), with the proviso that Components (a) and (b) together constitute 50–65% of the dry weight of the composition and Components (a), (b) and (c) together constitute 100% of the dry weight of the composition, and
    wherein each $R_1$ is independently chloro or bromo, and $R_2$ is hydrogen or acetyl.

14. A disperse dye composition according to claim 13 comprising
(a) 35.9% by weight of the compound of the formula

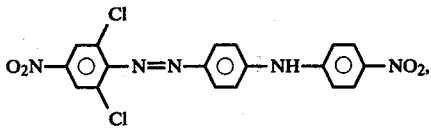

(b) 19% by weight of the compound of the formula

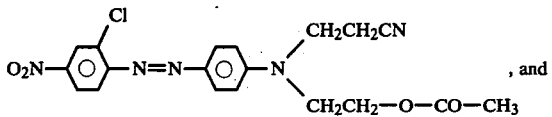

(c) 45.1% by weight of (i) a dispersing agent or (ii) a mixture of dispersing agents.

15. A process for dyeing a substrate comprising contacting the substrate with a disperse dye composition according to claim 1.

16. A substrate dyed with a disperse dye composition according to claim 1.

17. A dyed substrate according to claim 16 wherein said substrate is a textile material comprising synthetic or semi-synthetic, hydrophobic, high molecular weight fibers.

18. A dyed substrate according to claim 17 wherein said substrate is a textile material comprising a linear aromatic polyester, cellulose triacetate, cellulose 2½ acetate or a synthetic polyamide.

19. A process according to claim 15 wherein the substrate is a textile material comprising synthetic or semi-synthetic, hydrophobic, high molecular weight fibers.

20. A process according to claim 19 wherein the substrate is a textile material comprising a linear aromatic polyester, cellulose triacetate, cellulose 2½ acetate or a synthetic polyamide.

* * * * *